United States Patent [19]

Numata et al.

[11] Patent Number: 5,557,933
[45] Date of Patent: Sep. 24, 1996

[54] MALFUNCTION DIAGNOSIS APPARATUS FOR INTERNAL COMBUSTION ENGINE

[75] Inventors: Akihito Numata, Ibaraki; Takashi Mukaihira, Katsuta; Toshio Ishii, Mito; Yutaka Takaku; Kazuya Kawano, both of Katsuta, all of Japan

[73] Assignee: Hitachi, Ltd., Tokyo, Japan

[21] Appl. No.: 302,409

[22] Filed: Sep. 8, 1994

[30] Foreign Application Priority Data

Sep. 8, 1993 [JP] Japan ................................. 5-223613

[51] Int. Cl.⁶ .................................................. F01N 3/20
[52] U.S. Cl. ................................ 60/274; 60/276; 60/277
[58] Field of Search ............................... 60/274, 276, 277

[56] References Cited

U.S. PATENT DOCUMENTS

| | | | |
|---|---|---|---|
| 5,134,847 | 4/1992 | Ogawa | 60/274 |
| 5,138,874 | 8/1992 | Davis | 73/118.1 |
| 5,158,059 | 10/1992 | Kuroda | 23/690 |
| 5,237,818 | 8/1993 | Ishii | 60/274 |
| 5,305,635 | 4/1994 | James | 73/116 |
| 5,335,539 | 8/1994 | Sweppy | 60/277 |
| 5,341,642 | 8/1994 | Kurihara | 60/277 |
| 5,394,744 | 3/1995 | James | 73/117.3 |

FOREIGN PATENT DOCUMENTS

| | | |
|---|---|---|
| 4243339 | 6/1993 | Germany. |
| 4234420 | 4/1994 | Germany. |
| 2-30915 | 2/1990 | Japan. |

*Primary Examiner*—Douglas Hart
*Attorney, Agent, or Firm*—Bardehle, Pagenberg, Dost, Altenberg, Frohwitter, Geissler & Partners

[57] ABSTRACT

Provided is an internal combustion engine malfunction diagnosis apparatus capable of diagnosing the deterioration of an internal combustion engine with a high accuracy and capable of diagnosing deterioration of a fluctuation factor detection section of the engine with a high accuracy in irrespective of the engine speed.

According to one embodiment of the present invention, there is provided a malfunction diagnosis apparatus for an internal combustion engine comprises: a crank angle detection sensor for detecting a crank angle of the internal combustion engine; a fluctuation factor measurement means for measuring a state of a fluctuation factor of the internal combustion engine; an angular-based data sampling section for sampling data of an output signal from the fluctuation factor measurement means at a predetermined rotation angle of a crank shaft in accordance with a crank angle signal from the crank angle detection sensor; a malfunction judgement section for judging a malfunction of the internal combustion engine on the basis of data sampled by the angular-based data sampling section; a time-based data sampling section for sampling an output signal from the fluctuation factor measurement means at every lapse of a predetermined constant time; and a fluctuation factor measurement means deterioration judgement section for judging deterioration of the fluctuation factor measurement means on the basis of data sampled by the time-based data sampling section.

23 Claims, 4 Drawing Sheets

MALFUNCTION DIAGNOSIS APPARATUS FOR INTERNAL COMBUSTION ENGINE

BACKGROUND OF THE INVENTION

The present invention relates to a malfunction diagnosis apparatus for an internal combustion engine which diagnoses, for example, the deterioration of a catalyst. One example of such a device purifies the exhaust gas of the internal combustion engine, using, a catalytic converter and an air-fuel ratio feedback control unit.

According to one such system, a catalytic converter is installed in an exhaust manifold in order to remove HC, NOx, and CO contained in the exhaust gas, and an air-fuel ratio feedback control unit is provided with an $O_2$ sensor (oxygen sensor) which is installed at the upstream side of the catalytic converter and detects an air-fuel ratio. An amount of fuel injection supplied to the internal combustion engine is controlled so that the air-fuel ratio will be a predetermined value (stoichiometric air-fuel ratio), because when the air-fuel ratio at the upstream side of the catalytic converter is at the stoichiometric air-fuel ratio, the catalytic converter is functioning effectively.

In an ordinary three-way catalyst system, when the performance of the catalytic converter itself degrades, the conversion efficiency of the injured component is reduced, even if the air-fuel ratio is accurately controlled by the aforementioned air-fuel ratio feedback control unit. Accordingly, it is desirable to determine the state of deterioration of the catalytic converter, and to warn about this when deterioration has occurred.

One apparatus for making that determination is the "Catalyst Deterioration Determination Device for Internal Combustion Engine" disclosed in U.S. Pat. No. 5,088,281, incorporated herein by reference. In this apparatus, oxygen sensors (in this case, binary sensors) are arranged at the upstream and downstream sides of the catalytic converter in order to measure the time between the instant when the output value of the upstream oxygen sensor has inverted and the instant when the output value of the downstream sensor inverts. The state of deterioration of the catalyst is determined based on the size of the measured time difference. Specifically, if the time difference is small, the catalyst is determined to be in a deteriorated state. A problem with such a catalyst deterioration determination apparatus is that the time difference fluctuates according to the engine speed, regardless of the degree of deterioration of the catalytic converter. Therefore, the accuracy of the determination of the catalytic converter deterioration is low. Further, despite the fact that the catalytic converter has deteriorated, an erroneous determination may be made that the catalytic converter is not in a deteriorated state. Further still, when the upstream sensor malfunctions, not only does the accuracy in the feedback control of the air-fuel ratio degrade, but also the accuracy in determining deterioration of the catalytic converter is degraded.

It is therefore an object of the present invention to provide a malfunction diagnosis apparatus for an internal combustion engine which is able to diagnose the deterioration of the internal combustion engine at a high accuracy, regardless of the engine speed, and which is also able to diagnose, at a high accuracy, the deterioration of a sensor (for example, an air-fuel ratio sensor on the upstream side of catalyst or the like).

SUMMARY OF THE INVENTION

The problems of the prior art are addressed by an internal combustion engine malfunction diagnosis apparatus capable of diagnosing the deterioration of the internal combustion engine with high accuracy and capable of diagnosing the deterioration of a fluctuation factor measurement section with high accuracy irrespective of the rotation speed of the engine. Further, the present invention provides an internal combustion engine malfunction diagnosis apparatus capable for diagnosing the deterioration of a catalyst with high accuracy and capable for diagnosing the deterioration of at least an air-fuel ratio sensor arranged at the upstream side of the catalyst with high accuracy irrespective of the rotation speed of the engine. This is accomplished according to one embodiment of the invention by sampling data used in the deterioration judgement by both time-based sampling and angular-based sampling.

According to one embodiment of the present invention, there is provided a malfunction diagnosis apparatus for an internal combustion engine comprising:

a crank angle detection sensor for detecting a crank angle of the internal combustion engine;

a fluctuation factor measurement means for measuring a state of a fluctuation factor of the internal combustion engine;

an angular-based data sampling section for sampling data of an output signal from the fluctuation factor measurement means at a predetermined rotation angle of a crank shaft in accordance with a crank angle signal from the crank angle detection sensor;

a malfunction judgement section for judging a malfunction of the internal combustion engine on the basis of data sampled by the angular-based data sampling section;

a time-based data sampling section for sampling an output signal from the fluctuation factor measurement means at every lapse of a predetermined constant time; and a fluctuation factor measurement means deterioration judgement section for judging deterioration of the fluctuation factor measurement means on the basis of data sampled by the time-based data sampling section.

According to a more specific embodiment:

the fluctuation factor measurement means comprises
 a pre-catalyst air-fuel ratio sensor arranged at an upstream side of a catalyst of said internal combustion engine to detect an air-fuel ratio of exhaust gas of the internal combustion engine at an upstream side of the catalyst and
 a post-catalyst air-fuel ratio sensor arranged at a downstream side of the catalyst to detect an air-fuel ratio of exhaust gas at the downstream side of the catalyst;

the angular-based data sampling section samples data of an output signal from the pre-catalyst air-fuel ratio sensor and an output signal from the post-catalyst air-fuel ratio sensor at a predetermined rotation angle of the crank shaft in accordance with the crank angle signal from the crank angle detection sensor;

the malfunction judgement section
 comprises a catalyst deterioration judgement section for judging deterioration of the catalyst on the basis of a relationship between the output signals of the pre-and post-catalyst air-fuel ratio sensors, and
 the output signals are sampled by said angular-based data sampling section;

the time-based data sampling section samples at least the output signal of the pre-catalyst air-fuel ratio sensor at every lapse of the constant time; and the measurement means deterioration judgement section is an air-fuel ratio sensor deterioration judgement section for judging deterioration of at least the pre-catalyst air-fuel ratio sensor on the basis of data sampled by the time-based data sampling section.

According to still a more specific embodiment, the malfunction diagnosis apparatus for the internal combustion engine further comprises:

- a first noise removal means for removing noise components from the output signals of the pre- and post-catalyst air-fuel ratio sensors and for supplying the angular-based data sampling section with the signals from which the noise components have been removed;
- a second noise removal means for removing noise components from the output signal of the pre-catalyst air-fuel ratio sensor and for supplying the time-based data sampling section with the signal from which the noise components have been removed;
- a catalyst monitoring zone judgement section having a preset catalyst monitoring zone constituted by predetermined conditions and determining whether the conditions of the catalyst monitoring zone are satisfied, the catalyst deterioration judgement section operating only when the conditions of the catalyst monitoring zone are satisfied;
- an engine speed sensor for detecting a rotational speed of the internal combustion engine;
- an intake air flow rate sensor positioned such that it detects an intake air flow rate of the internal combustion engine;
- wherein the catalyst monitoring zone judgement section judges that the conditions of the catalyst monitoring zone are satisfied when the rotational speed of the internal combustion engine is higher than, or equal to, a predetermined rotational speed value and when a catalyst temperature, estimated from the rotational speed and intake air flow rate of the internal combustion engine, is higher than or equal to a predetermined temperature.

According to still an even more specific embodiment, each of the pre-catalyst air-fuel ratio sensor and the post-catalyst air-fuel ratio sensor are oxygen sensors.

According to yet a further specific embodiment, the catalyst deterioration judgement section comprises:

- a correlation function computation section which calculates cross-correlation functions of the output signals of the pre- and post-catalyst air-fuel ratio sensors and auto-correlation functions of the output signals of the pre-catalyst air-fuel ratio sensor, wherein the output signals are obtained from the angular-based data sampling section;
- a sequential deterioration index computation section which calculates a sequential deterioration index which is a ratio of a maximum value of the cross-correlation functions and a maximum value of the auto-correlation functions;
- a final deterioration index computation section which calculates
  an average value of a predetermined number of sequential deterioration indexes and
  a final deterioration index value on the basis of the calculated average value;
- a comparison section which compares the final deterioration index with a predetermined reference deterioration index; and
- a judgement section which judges deterioration of the catalyst on the basis of an output signal from the comparison section.

According to still a further embodiment, in the malfunction diagnosis apparatus for the internal combustion engine, the air-fuel ratio sensor deterioration judging section includes a difference computation section which is supplied with output data from the time-based data sampling section, and the difference computation section calculates a difference between temporally adjacent data among the supplied data.

According to even a further specific embodiment, the malfunction diagnosis apparatus for the internal combustion engine comprises the crank angle detection sensor of the internal combustion engine, the fluctuation factor measurement section measuring the state of the fluctuation factor of the internal combustion engine, the angular-based data sampling section samples data of the output signal from the fluctuation factor measurement section at every constant rotation angle of the crank shaft in accordance with the rotation angle signal, the malfunction judgement section judges the malfunction of the internal combustion engine on the basis of the data sampled by the angular-based data sampling section, the time-based data sampling section samples the output signal from the fluctuation factor measurement section at every lapse of the constant time period, and the fluctuation factor measurement section deterioration judgement section judges the deterioration of the fluctuation factor measurement section on the basis of the data sampled by the time-based data sampling section.

According to still a further specific embodiment, the malfunction diagnosis apparatus comprises the crank angle detection sensor of the internal combustion engine, the pre-air-fuel ratio sensor detects the air-fuel ratio of the exhaust gas at the upstream side of the catalyst, the post-air-fuel ratio sensor detects the air-fuel ratio of the exhaust gas at the downstream side of the catalyst, the angular-based data sampling section samples the output signals from the pre- and post-air-fuel ratio sensors at a constant rotation angle of the crank shaft in accordance with the crank angle signal from the crank angle detection sensor, the catalyst deterioration judgement section judges the deterioration of the catalyst on the basis of the relation between the output signals (which have been sampled by the angular-based data sampling section) of the pre- and post-air-fuel ratio sensors, the time-based data sampling section samples the output signal of the pre-air-fuel ratio sensor at every lapse of the constant time period, and the air-fuel ratio sensor deterioration judgement section judges the deterioration of the pre-air-fuel ratio sensor on the basis of the data sampled by the time-based data sampling section.

In the operation of an example embodiment of the present invention, the angular-based signal from the crank angle detection sensor of the internal combustion engine is supplied to the angular-based data sampling section. In accordance with the angular-based signal supplied from the crank angle detection sensor, the angular-based data sampling section samples data of the output signal of the fluctuation factor measurement section at a constant rotation angle of the crank shaft (for example, every 720 degrees; i.e. once every two revolutions). Based on the data which is sampled at a constant rotation angle, the malfunction judgement section judges the malfunction of the internal combustion engine. The output signal from the fluctuation factor measurement section is sampled at every lapse of the constant time by the time-based data sampling section. Based on the signal which is sampled at every lapse of the constant time, the fluctuation factor measurement section deterioration judgement section judges the deterioration of the fluctuation factor measurement section.

DESCRIPTION OF THE DRAWINGS

For a more complete understanding of the present invention and for further advantages thereof, reference is made to the following Detailed Description taken in conjunction with the accompanying drawings, in which.

Figure 1:
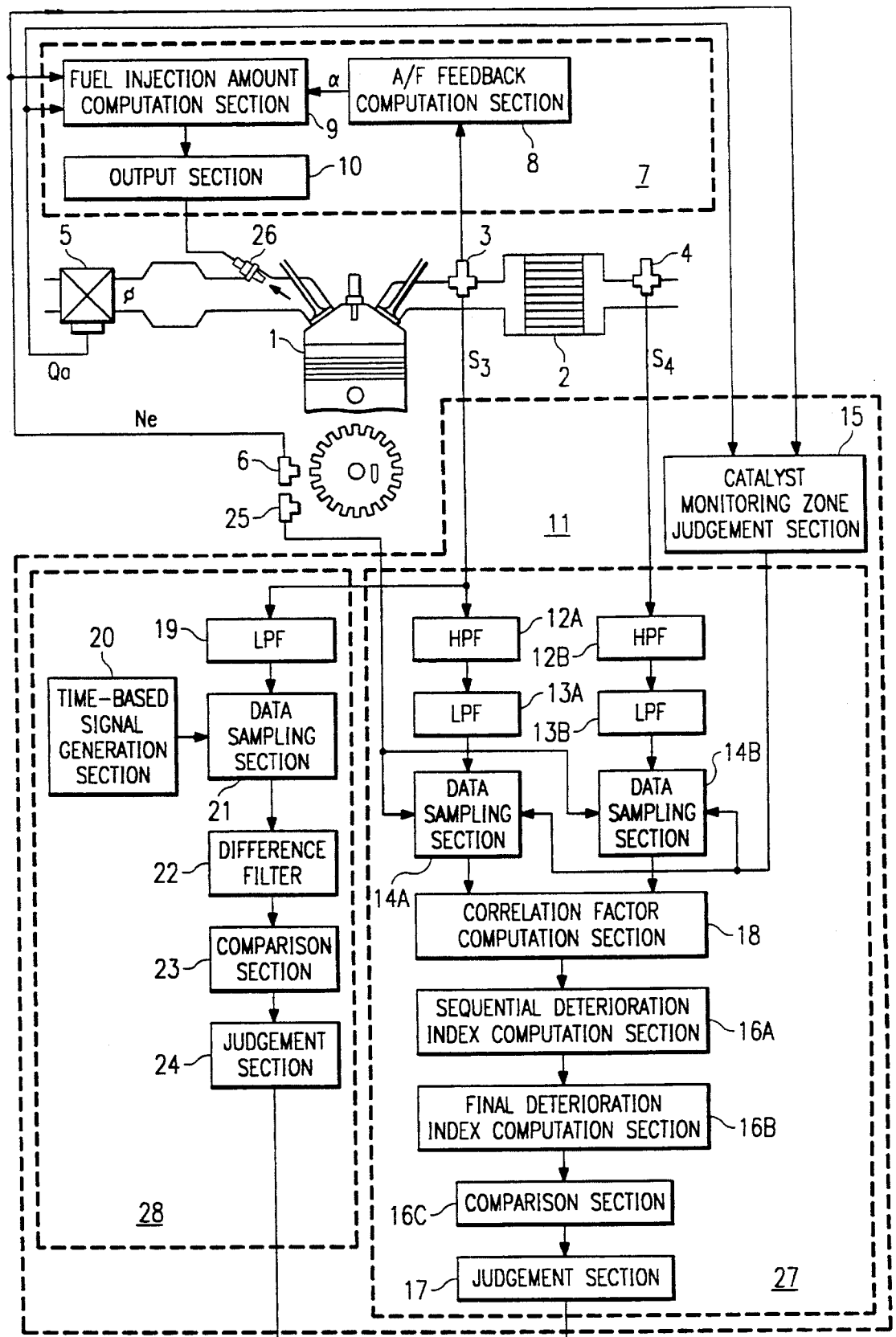
FIG. 1 is a schematic block diagram of one embodiment of the present invention.

Reference numbers in the drawings generally represent the following:

| | |
|---|---|
| 1 | engine |
| 2 | catalytic converter |
| 3 | pre-$O_2$ sensor |
| 4 | post-$O_2$ sensor |
| 5 | intake air flow sensor |
| 6 | engine speed sensor |
| 7 | fuel injection control section |
| 8 | air-fuel ratio feedback computation section |
| 9 | fuel injection amount computation section |
| 10 | output section |
| 11 | deterioration judgment section |
| 12A, 12B | high pass filter |
| 13A, 13B | low-pass filter |
| 14A, 14B | data sampling section |
| 15 | catalyst monitoring zone judgement section |
| 16A | sequential deterioration index computation section |
| 16B | final deterioration index computation section |
| 16C | comparison section |
| 17 | judgement section |
| 18 | correlation factor computation section |
| 18A | auto-correlation computation section |
| 18B | cross-correlation computation section |
| 18C | cross-correlation function computation section |
| 19 | low-pass filter |
| 20 | time-based signal generating section |
| 21 | data sampling section |
| 22 | difference filter |
| 23 | comparison section |
| 24 | judgement section |
| 25 | crank angle sensor |
| 26 | fuel injector |
| 27 | catalyst deterioration judgement section |
| 28 | $O_2$ sensor deterioration judgement section |
| I | final deterioration index |
| Ne | engine speed |
| Qa | intake air flow rate |
| S3 | output signal of pre-$O_2$ sensor |
| S4 | output signal of post-$O_2$ sensor |
| X | self-correlation function |
| Y | cross-correlation function |
| $\Phi i$ | sequential deterioration index |

It is to be noted that the appended drawings illustrate only typical embodiments of this invention and are therefore not to be considered limiting of its scope, for the invention will admit to other equally effective embodiments.

DETAILED DESCRIPTION

Referring now to the example embodiment of FIG. 1, a fuel injection control section 7 includes an air-fuel ratio feedback computation section 8, a fuel injection amount computation section 9, and an output section 10 to thereby control an amount of fuel injection for an engine 1. A pre-$O_2$ sensor or an oxygen sensor (air-fuel ratio sensor) 3 is arranged at the upstream side of a catalytic converter 2. According to one embodiment, the pre-$O_2$ sensor 3 is a lambda ($\lambda$) sensor, using, for example, zirconia or titania for the detection element.

Based on an intake air flow rate Qa detected by an intake air flow rate sensor 5 and an engine speed Ne detected by an engine speed sensor 6, the fuel injection amount computation section 9 calculates a basic amount of injection F0 according to the following equation (1).

$$F0 = k0 Qa/Ne \tag{1}$$

where k0 is a predetermined coefficient.

On the other hand, the air-fuel ratio feedback computation section 8 samples the output signals of the pre-catalyst oxygen sensor 3 arranged upstream of the catalytic converter 2 at a predetermined timing. The air-fuel ratio feedback computation section 8 calculates a correction coefficient $\alpha$ in response to the sampled values so that an air-fuel ratio will be a desired value, and supplies the coefficient to the fuel injection amount computation section 9.

The fuel injection amount computation section 9 calculates an injection amount F based on the basic injection amount F0 in terms of the correction coefficient $\alpha$ according to the following equation (2).

$$F = k0 Qa/Ne(1+\alpha) \tag{2}$$

The fuel injection amount computation section 9 then supplies a signal indicating the calculated injection amount F to the output section 10. Then, the output section 10 applies a voltage duty ratio signal corresponding to the injection amount F to fuel injection valves 26. An air-fuel ratio at the upstream side of the catalytic converter 2 fluctuates at a value around the stoichiometric air-fuel ratio.

According to this example embodiment, the fluctuation of the air-fuel ratio in this air-fuel ratio feedback control is used as a test signal for judging deterioration of a catalytic converter. Namely, if the catalytic converter 2 is not deteriorated, the fluctuation of the air-fuel ratio at the downstream side of the catalytic converter 2 is reduced by the oxidation-reduction action of the catalyst. On the other hand, if the catalytic converter 2 is deteriorated, the fluctuation of the air-fuel ratio at the downstream approaches that of the air-fuel ratio at the upstream. Thus, the deterioration is diagnosed by monitoring the similarity of the air-fuel ratio fluctuation at the downstream and upstream sides of the catalytic converter, through, for example, correlation of the output signals of the pre-$O_2$ sensor and the post-$O_2$ sensor.

A deterioration judgment section 11 is provided with a catalyst monitoring zone judgement section 15, a catalyst deterioration judgement section 27, and a pre-$O_2$ sensor deterioration judgement section 28. The catalyst deterioration judgement section 27 has high-pass filters (HPFs) 12A and 12B (for example, having an $f_c$ of about 0.5 Hertz), low-pass filters (LPFs) 13A and 13B (for example, having an $f_c$ of about 5 Hertz), and data sampling sections 14A and 14B. Furthermore, the catalyst deterioration judgement section 27 includes a correlation factor computation section 18, a sequential deterioration index computation section 16A, a final deterioration index computation section 16B, a comparison section 16C, and a judgement section 17.

It should be noted that although the embodiment shown in FIG. 1 includes a deterioration judgment section having filters 12A, 12B, 13A, and 13B positioned on the input side of data sampling sections 14A and 14B, according to an alternative embodiment, the components are rearranged such that the outputs of data sampling sections 14A and 14B provide the input to high pass filters 12A and 12B, respectively. According to such an embodiment, the disturbance of the state of the exhaust gas near the sensor (depending upon the engine speed) is measured.

The $O_2$ sensor deterioration judgement section 28 is provided with a low-pass filter 19, a time-based signal generation section 20, and a data sampling section 21. Furthermore, the $O_2$ sensor deterioration judgement section 28 includes a difference filter 22, a comparison section 23, and a judgement section 24.

The output signal Qa from the intake air flow rate sensor 5 and the output signal Ne from the engine speed sensor 6 are supplied to the catalyst monitoring zone judgement section 15. The output signal from the catalyst monitoring zone judgement section 15 is then supplied to the data sampling sections 14A and 14B.

A post-$O_2$ sensor 4 having the same configuration as the pre-$O_2$ sensor 3 is arranged at the downstream side of the catalytic converter 2. The output signal S4 from the post-$O_2$ sensor 4 is supplied to the data sampling section 14B via the high-pass filter 12B and the low-pass filter 13B. The output signal from the data sampling section 14B is supplied to the judgement section 17 via the correlation factor computation section 18, the sequential deterioration index computation section 16A, the final deterioration index computation section 16B, and the comparison section 16C.

The output signal S3 from the pre-$O_2$ sensor 3 is supplied to the data sampling section 14A via the high-pass filter 12A and the low-pass filter 13A. The output signal from the data sampling section 14A is supplied to the judgement section 17 via the correlation factor computation section 18, the sequential deterioration index computation section 16A, the final deterioration index computation section 16B, and the comparison section 16C.

The aforementioned data sampling sections 14A and 14B receive the angular-based signal from a crank angle sensor 25, sampling the data of the signals S3 and S4 at a constant rotation angle of a crank shaft of the engine.

The output signal S3 from the pre-$O_2$ sensor 3 is supplied to the data sampling section 21 via the low-pass filter 19. This data sampling section 21 receives the time-based signal from the time-based signal generation section 20, sampling the data of the signal S3 at every constant time period.

The output signal from the data sampling section 21 is supplied to the judgement section 24 via the difference filter 22 and the comparison section 23.

Figure 2:
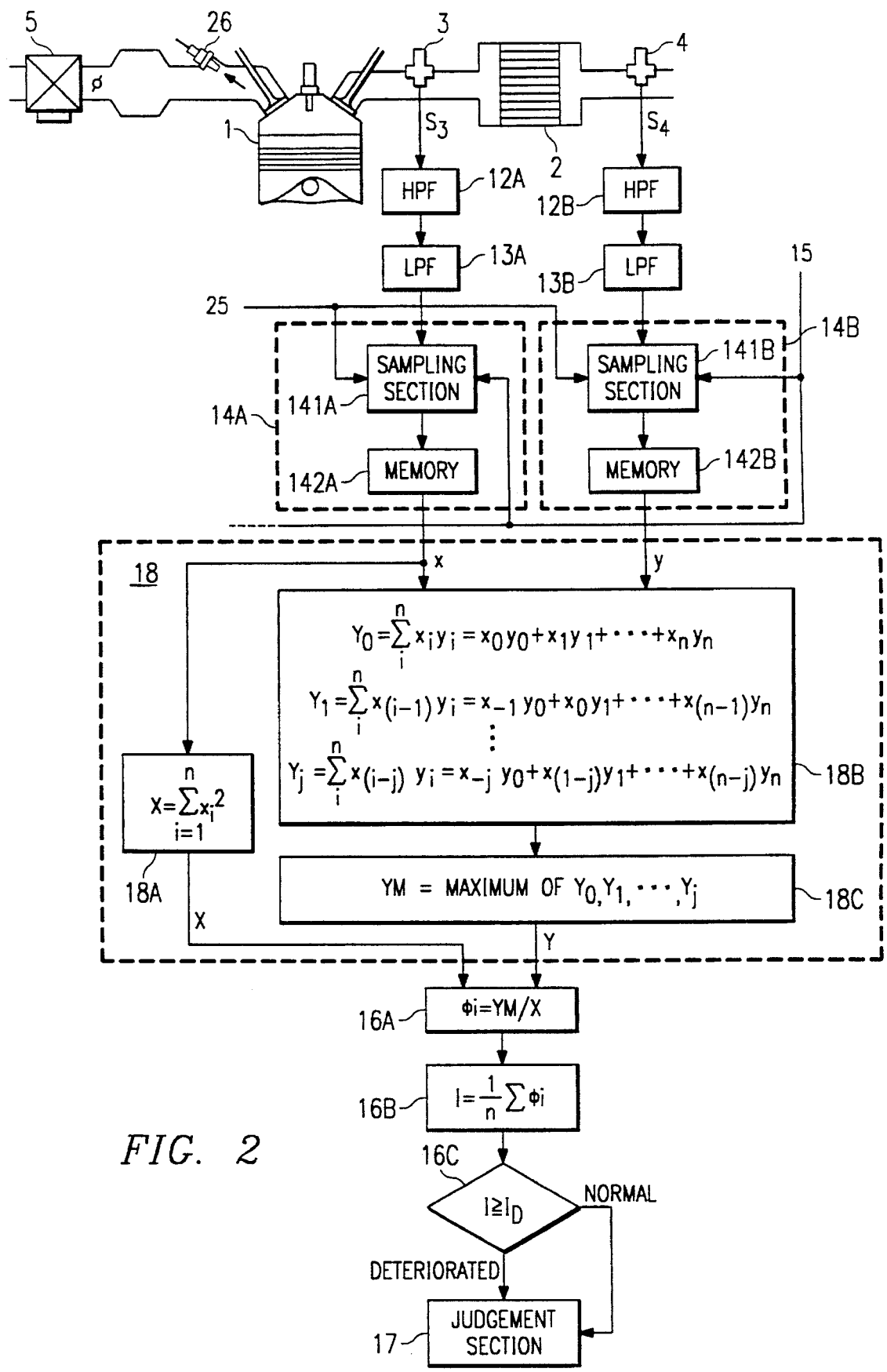
FIG. 2 is a functional block diagram showing the catalyst deterioration judgement section.
Figure 3:
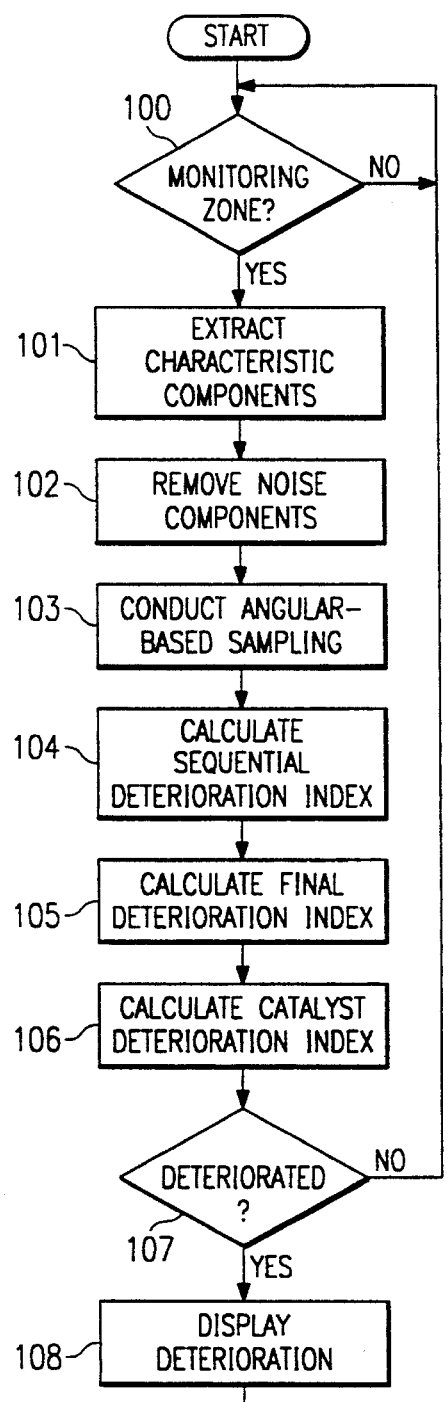
FIG. 3 is a flow chart showing an operation for determining deterioration of the catalyst.

FIG. 2 is a block diagram showing the detailed structure of the catalyst deterioration judgement section 27. FIG. 3 is a flow chart showing an operation for judging deterioration of the catalyst.

Figure 4:
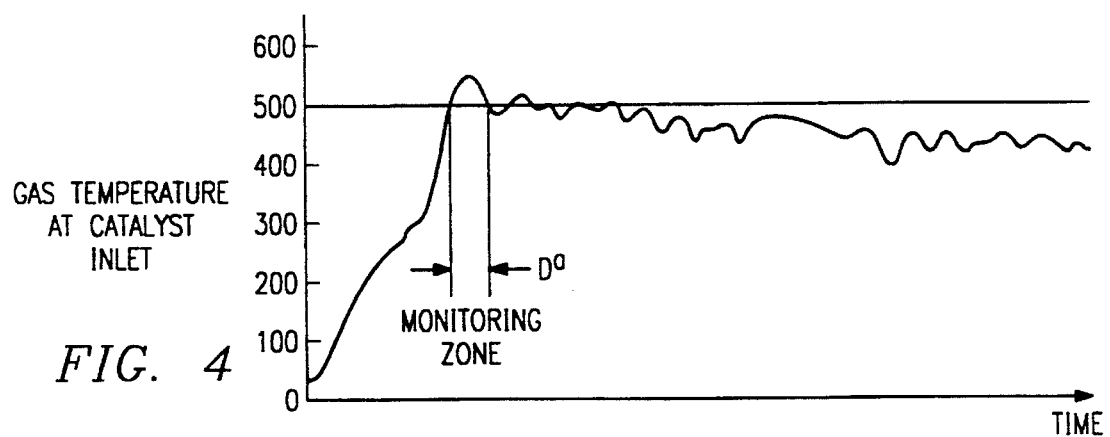
FIG. 4 is a graph used to explain the deterioration monitoring zone of the catalytic converter.

In step 100 shown in FIG. 3, the catalyst monitoring zone judgement section 15 judges whether or not the conditions of the engine and the catalytic converter are within a monitoring zone Da of the catalyst on the basis of the intake air flow rate signal Qa and the engine speed signal Ne. Namely, it is judged whether or not the engine speed is higher than or equal to a predetermined rotational speed, and the temperature of the catalytic converter 2 (which is related to the flow rate, as is known to those of skill in the art) is, for example, higher than or equal to 500° C. as shown in FIG. 4. When the above conditions have been established, the catalyst monitoring zone judgement section 15 supplies a sampling commencement signal to the data sampling sections 14A and 14B. The process then proceeds to step 101.

In step 101, the characteristic components of the signals S3 and S4 from the pre- and post-$O_2$ sensors 3 and 4 are respectively extracted by the high-pass filters 12A and 12B. In step 102, the characteristic components extracted by the high-pass filters 12A and 12B are supplied to the low-pass filters 13A and 13B, and the noise components of the signals S3 and S4 are removed, respectively. Next, in step 103, the signals S3 and S4 from which the noise components have been removed are supplied to sampling sections 141A and 141B, and the data of the signals S3 and S4 is sampled at a constant rotation angle of the crank shaft by the sampling sections in accordance with the angular-based signal from the crank angle sensor 25.

The signals S3 and S4 fluctuate according to engine speed. If these signals S3 and S4 are sampled at a constant rotation angle of the crank shaft, it is possible to suppress the pernicious influence of combustion deterioration (misfire, abnormal combustion etc.) and external disturbance (canister purge etc.), and so on, which are generated in synchronization with engine rotation.

The signals S3 and S4 sampled in the sampling sections 141A and 141B are temporarily stored in memories 142A and 142B, respectively.

Next, in step 104, the output signal x from the memory 142A and the output signal y from the memory 142B are supplied to a cross-correlation computation section 18B, and the estimations shown in the following equations (3-0 to 3-j) are conducted.

$$Y_0 = \sum_{i}^{n} x_i y_i = x_0 y_0 + x_1 y_1 + \ldots + x_n y_n \qquad (3\text{-}0)$$

$$Y_1 = \sum_{i}^{n} x_{(i-1)} y_i = x_{-1} y_0 + x_0 y_1 + \ldots + x_{(n-1)} y_n \qquad (3\text{-}1)$$

$$Y_2 = \sum_{i}^{n} x_{(i-2)} y_i = x_{-2} y_0 + x_{-1} y_1 + \ldots + x_{(n-2)} y_n \qquad (3\text{-}2)$$

$$Y_j = \sum_{i}^{n} x_{(i-j)} y_i = x_{-j} y_0 + x_{(1-j)} y_1 + \ldots + x_{(n-j)} y_n \qquad (3\text{-}j)$$

Figure 5:
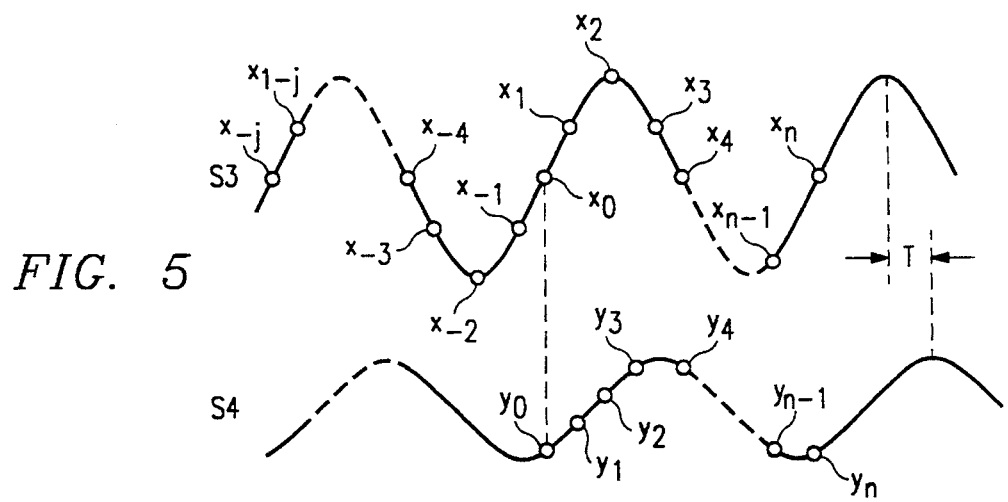
FIG. 5 is an explanatory diagram for explaining correlation calculation which is calculated by the cross-correlation computation section.

As shown in FIG. 5, the suffixes of the signals x and y represent sampling timings, and the same suffix represents the same sampling timing.

The estimation interval n is a predetermined period for sufficiently calculating the cross-correlation computation. For example, the estimation interval n is set to a period corresponding to the period of 200 r.p.m. of the engine.

Further, in the above calculation, the maximum deviation value j between the sampling timings of the signals x and y is larger than or equal to one cycle of the signal S3. The time period T shown in FIG. 5 is the delay time (phase) of the output signal S4 of the sensor 4 relative to the output signal S3 of the sensor 3. The estimation having the sampling timing deviation nearly equal to the time period T is the maximum value in the above estimates $Y_0$ to $Y_j$.

The computation results obtained by the above equations (3-0) to (3-j) are supplied to a maximum cross-correlation function computation section 18C, and the maximum cross-correlation function YM shown in the following equation (4) is calculated.

$$YM = MAX(Y_0, Y_1, Y_2, \ldots Y_j) \quad (4)$$

The output signal x from the memory 142A is also supplied to an auto-correlation computation section 18A. The auto-correlation computation section 18A executes the calculation shown in the following equation (5).

$$X = \sum_{i}^{n} x_i^2 \quad (5)$$

The calculated auto-correlation function X and maximum cross-correlation function YM are supplied to the computation section 16A. The computation section 16A calculates a sequential deterioration index $\Phi i$ according to the following equation (6).

$$\Phi i = YM/X \quad (6)$$

Figure 6:
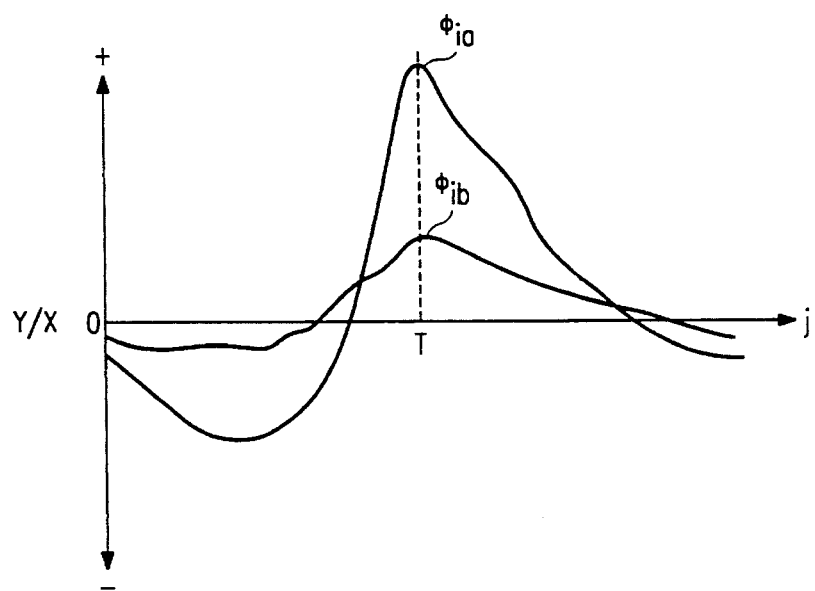
FIG. 6 is a graph which shows the relation of the deterioration of the catalytic converter and the deterioration index $\Phi i$.

When the catalytic converter 2 deteriorates, since the degree of similarity of the air-fuel ratio fluctuation at the upstream and downstream sides of the catalytic converter 2 increases, the sequential deterioration index $\Phi i$ becomes large (approaches 1). This is shown in FIG. 6. Namely, the deterioration index $\Phi ia$ (when the deterioration of the catalytic converter 2 is large) is larger than the deterioration index $\Phi ib$ (when the deterioration of the catalytic converter 2 is small).

The deterioration indexes $\Phi i$ are sequentially calculated in the above-mentioned manner, being supplied to the final deterioration index computation section 16B.

Next, in step 106, the computation section 16B calculates the average value of the calculated deterioration indexes $\Phi i$ of n times, as shown in equation (7). The calculated average is made to be the final deterioration index I of the catalyst converter 2.

$$I = (\Sigma \Phi i)/n \quad (7)$$

According to various embodiments of the invention, when this final deterioration index I is calculated, the correction factors based on the various operating conditions of the engine may be taken into consideration. For example, according to a specific embodiment, the correction factors k1 and k2 based on an engine load and a catalyst temperature respectively are taken into consideration to provide the following equation: $I = (\Sigma k1 k2 \Phi i)/n$. In some embodiments, correction factors k1 and k2 are previously stored in the memory as map data and the average value of the deterioration indexes $\Phi i$ are made to the average value from the maximum deterioration index $\Phi i$ to the n-th deterioration index.

Next, in step 107, the calculated final deterioration index I is supplied to the comparison section 16C, being compared with a predetermined deterioration judgement level ID. If the final deterioration index I is less than the deterioration judgement level ID, the process returns to step 100. In step 107, when the final deterioration index I is higher than or equal to the deterioration judgement level ID, the catalyst is judged to be deteriorated, and the signal indicating the deterioration is supplied to the judgement section 17. Thereupon, the process proceeds to step 108, the display section (not illustrated) being driven by the judgement section 17 to display the deterioration of the catalytic converter 2.

Figure 7:
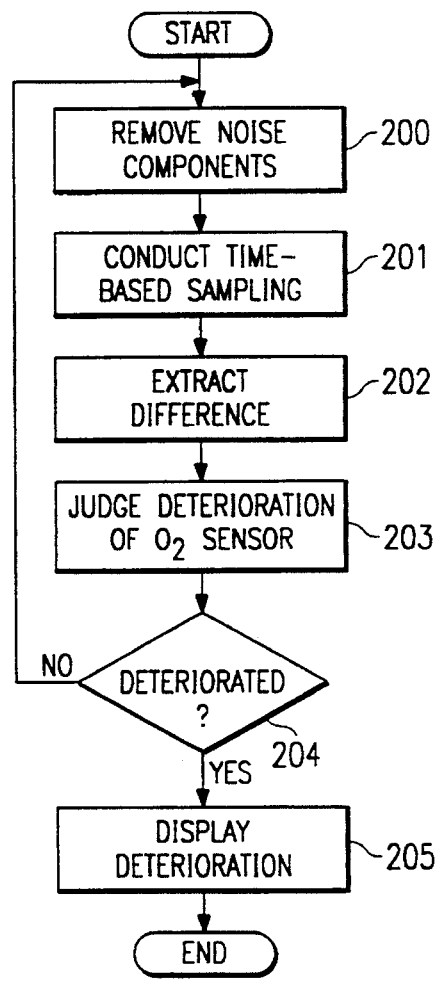
FIG. 7 is a flow chart showing an operation of the pre-catalyst oxygen sensor deterioration judgement section.

In step 200, in FIG. 7, the noise component of the output signal S3 from the pre-$O_2$ sensor 3 is removed by the low-pass filter 19. Then the process proceeds to step 201, the signal S3 is sampled at every constant time period by the data sampling section 21. The deterioration of the pre-$O_2$ sensor 3 is judged on the basis of the magnitude of the incline of the signal wave form of the signal S3. Accordingly, in the deterioration judgement of the pre-$O_2$ sensor 3, the signal S3 is sampled at every lapse of the constant time period.

In the above-mentioned step 201, the sampled signal S3 is supplied to the difference filter 22. The process proceeds to step 202, and the difference data is calculated by the difference filter 22. Namely, the preceding data is subtracted from the current data. Next, the process proceeds to step 203, and the above difference data and the predetermined reference value are compared in the comparison section 23. It is then judged in the judgement section 24 whether the pre-$O_2$ sensor 3 is deteriorated or not. Next, the process proceeds to step 204, and if the above difference data is larger than the predetermined reference value, the oxygen sensor is judged to be not deteriorated, and the process returns to step 200. In step 204, if the above difference data is smaller than the predetermined reference value, the $O_2$ sensor is judged to be deteriorated, and the process proceeds to step 205. In step 205, the display section (not shown) is driven by the judgement section 24, and it is displayed that the pre-$O_2$ sensor 3 is deteriorated.

According to one embodiment of the present invention, as described above, the deterioration of the catalytic converter 2 is diagnosed based on the fluctuation of the output signal S3 from the pre-$O_2$ sensor 3 arranged at the upstream side of the catalytic converter 2, and the fluctuation of the output signal S4 from the post-$O_2$ sensor 4 arranged at the downstream side. In the case of deterioration judgment of this catalytic converter, the characteristic components of the output signals S3 and S4 of the pre- and post-$O_2$ sensors 3 and 4 are extracted by the high-pass filters 12A and 12B, and the noise components thereof are removed by the low-pass filters 13A and 13B, respectively. The signals from which the noise components have been removed are sampled at a constant rotation angle of the crank shaft by the data sampling sections 14A and 14B, and the deterioration of the catalytic converter 2 is judged on the basis of the sampled data. Accordingly, it is possible to diagnose the deterioration of the catalytic converter with a high accuracy irrespective of an engine speed.

In the deterioration judgment of the catalytic converter 2, the output signal S3 of the pre-$O_2$ sensor 3 is sampled at a constant rotation angle of the crank shaft. Further, in the deterioration judgment of the pre-$O_2$ sensor 3, the output signal S3 is sampled at every lapse of the constant time period. Namely, when the deterioration of the pre-$O_2$ sensor 3 is diagnosed on the basis of the magnitude of the incline of the output signal S3, the noise components of the output signal S3 are removed by the low-pass filter 19. The signal from which the noise components have been removed is sampled at every lapse of the constant time period by the data sampling section 21, and the sampled signal is supplied to the difference filter 22. The deterioration of the pre-$O_2$ sensor 3 is judged on the basis of the data from the difference filter 22. Accordingly, the deterioration of the pre-catalyst oxygen sensor 3 can be diagnosed with a high accuracy.

Accordingly, it is possible to realize an internal combustion engine malfunction diagnosis apparatus capable for diagnosing the deterioration of a catalyst with high accuracy and capable for diagnosing the deterioration of an air-fuel ratio sensor arranged at the upstream side of the catalyst with high accuracy irrespective of the rotation speed of the engine.

In the above embodiment, the signals S3 and S4 from the $O_2$ sensors 3 and 4 are supplied to the high-pass filters 12A and 12B and the low-pass filters 13A and 13B. According to alternative embodiments, band-pass filters are used in place of the high-pass filters and the low-pass filters.

According to alternative embodiments, the high-pass filters 12A, 12B and the low-pass filters 13A, 13B, and 19 are made of analog circuits constituted by parts such as resistors and capacitors or digital circuits executing filtering process by using software.

According to a further alternative embodiments, the difference filter 22 is made of analog circuits comprising a delay circuit and a subtraction circuit or a digital circuit executing subtraction of the current data and the data which is temporally just before the current data by using software.

In the above embodiment, an oxygen sensor was used as the air-fuel ratio sensor, but the kind of the sensor is not limited to the oxygen sensor, other sensors will occur to those of ordinary skill that are capable of detecting an air-fuel ratio.

Moreover, in the above embodiment, the deterioration of the pre-$O_2$ sensor 3 is judged. According to other embodiments, the deterioration of the post-$O_2$ sensor 4 is executed in the same manner as the deterioration judgment of the pre-$O_2$ sensor 3.

Furthermore, in the above embodiment, the deterioration of the catalyst is judged on the basis of the angular-based sampling data of the output signals from the pre- and post-$O_2$ sensors, and the deterioration of the pre-$O_2$ sensor is judged on the basis of the time-based sampling data of the output signal from the pre-$O_2$ sensor. According to other embodiments, the deterioration of other portion of the internal combustion engine is judged. According to still further embodiments, the deterioration of other sensors (fluctuation factor measuring section) measuring other fluctuation factors (pressure, temperature, flow rate, etc.) are judged.

For example, according to one specific embodiment, the output signal from the intake air flow rate sensor is sampled at a constant rotation angle of the crank shaft, and the pressure of an intake manifold is estimated on the basis of the sampling data. From the difference between the estimated pressure at the operation time of EGR (exhaust gas recirculation) and the pressure actually measured by the pressure sensor, it is judged by the malfunction judgement section whether or not the EGR operation is normal. The output signal from the intake air flow rate sensor is sampled at every lapse of the constant time period, and the deterioration of the intake air flow rate sensor is judged by a fluctuation factor measurement section deterioration judgement section having a construction nearly equal to the construction of the $O_2$ sensor deterioration judgement section 28.

The above embodiments are given by way of example only, and other embodiments will occur to those of skill in the art which do not depart from the spirit of the invention.

What is claimed is:

1. A malfunction diagnosis apparatus for an internal combustion engine comprising:

a fluctuation factor state measurement sensor;

an angular-based data sampler which samples data of an output signal from said fluctuation factor state measurement sensor at a rate dependent on engine speed;

a malfunction judgment means for judging a malfunction of a function of said internal combustion engine on the basis of data sampled by said angular-based data sampler;

a time-based data sampler which samples an output signal from said fluctuation state measurement sensor at every lapse of a predetermined constant time and supplies said output signal from said time-based data sampler to a filter.

2. A malfunction diagnosis apparatus as in claim 1 further comprising a fluctuation factor state measurement sensor deterioration judgment means for judging deterioration of said fluctuation factor state measurement sensor on the basis of data sampled by said time-based data sampler wherein said deterioration judgment means is responsive to a magnitude of an incline of a wave form of said sampled data.

3. A malfunction diagnosis apparatus as in claim 1, wherein said fluctuation factor state measurement sensor comprises:

a pre-catalyst air-fuel ratio sensor arranged at an upstream side of a catalyst of said internal combustion engine to detect an air-fuel ratio of exhaust gas of said internal combustion engine at an upstream side of said catalyst, and a post-catalyst air-fuel ratio sensor arranged at a downstream side of said catalyst to detect an air-fuel ratio of exhaust gas at the downstream side of said catalyst.

4. A malfunction diagnosis apparatus as in claim 3, further comprising a noise removal means for removing noise components from the output signal of said pre-catalyst air-fuel ratio sensor.

5. A malfunction diagnosis apparatus as in claim 2, further comprising a catalytic converter judgement means having a preset catalyst monitoring zone constituted by predetermined conditions and for determining whether said predetermined conditions of said preset catalyst monitoring zone are satisfied.

6. A malfunction diagnosis apparatus as in claim 5, further comprising:

an engine speed sensor for detecting a rotational speed of said internal combustion engine, and an intake air flow rate sensor for detecting an intake air flow rate of said internal combustion engine, wherein said catalyst monitoring zone judgement section judges that the conditions of said catalyst monitoring zone are satisfied when the rotational speed of said internal combustion engine is higher than or equal to a predetermined rotational speed value, and a catalyst temperature estimated from the rotational speed, and intake air flow rate of said internal combustion engine is higher than or equal to a predetermined temperature.

7. A malfunction diagnosis apparatus as in claim 5, wherein said catalytic converter deterioration judgement section includes:

a correlation function computation section for calculating cross-correlation functions of the output signals of said pre- and post-catalyst air-fuel ratio sensors and autocorrelation functions of the output signals of said pre-catalyst air-fuel ratio sensor, wherein said output signals are obtained from said angular-based data sampling section;

a sequential deterioration index computation section for calculating a sequential deterioration index which is proportional to a ratio of a value of said cross-correlation functions and a value of said auto-correlation functions;

a final deterioration index computation section for calculating an average value of a predetermined number of sequential deterioration indexes, and for calculating a value on the basis of the calculated average value as a final deterioration index;

a comparison section for comparing said final deterioration index with a predetermined reference deterioration index; and a judgement section for judging deterioration of said catalyst on the basis of an output signal from said comparison section.

8. A malfunction diagnosis apparatus as in claim 1 wherein said angular-based data sampler samples data no more than one per engine revolution and only at the same engine revolution angle for each sampling event.

9. A process for diagnosing the deterioration of an automobile function, comprising:

sampling data of an output signal of a first fluctuation factor measurement section at a constant time interval, wherein a first sampled signal is defined;

sampling data of an output signal of a second fluctuation factor measurement section at a rate dependent upon engine speed, wherein a second sampled signal is defined; and judging the deterioration of the fluctuation factor based on the sample data, wherein said judging comprises subtracting previous sampled data from the sampled data.

10. A process as in claim 9 wherein said sampling dependent upon engine speed comprises sampling upon the rotation of the crank shaft through a constant rotation angle.

11. A process as in claim 9 wherein said first and second fluctuation factor measurement sections comprise the same fluctuation factor measurement sections.

12. A process as in claim 9 wherein the fluctuation factor measurement section judges the deterioration of the fluctuation factor measurement section based on a correlation between first sampled signal and the second sampled signal.

13. A process as in claim 9 wherein said first fluctuation factor measurement section comprises an air-fuel ratio sensor arranged at the upstream side of an exhaust catalytic converter and said second fluctuation measurement section comprises an air-fuel ratio sensor arranged at the downstream side of the exhaust catalytic converter.

14. A process as in claim 9 wherein said judging comprises judging the deterioration of the fluctuation factor measurement section based on the correlation between sampled signal.

15. A process as in claim 9 wherein said sampling at a rate dependent on engine speed is made no more than once per engine revolution and only at the same engine revolution angle at each sampling event.

16. A device for diagnosing the deterioration of an automobile function, comprising:

means for sampling data of an output signal of a first fluctuation factor measurement section at a constant time interval, wherein a first sampled signal is defined;

means for supplying said first sampled signal to a difference filter which subtracts a previously supplied first sampled signal from said first sampled signal;

means for sampling data of an output signal of a second fluctuation factor measurement section at a rate dependent upon engine speed, wherein a second sampled signal is defined; and means for judging the deterioration of the fluctuation factor based on the sampled data.

17. A device as in claim 16 wherein said means for sampling dependent upon engine speed comprises means for sampling upon the rotation of the crank shaft through a constant rotation angle.

18. A device as in claim 16 wherein said first and second fluctuation factor measurement sections comprise the same fluctuation factor measurement sections.

19. A device as in claim 16 wherein the fluctuation factor measurement section judges the deterioration of the fluctuation factor measurement section based on a correlation between first sampled signal and the second sampled signal.

20. A device as in claim 16 wherein said first fluctuation factor measurement section comprises an air-fuel ratio sensor arranged at the upstream side of an exhaust catalytic converter and said second fluctuation measurement section comprises an air-fuel ratio sensor arranged at the downstream side of the exhaust catalytic converter.

21. A device as in claim 16 wherein said means for judging comprises means for judging the deterioration of the fluctuation factor measurement section based on the correlation between sampled signal.

22. A device as in claim 16 wherein said means for sampling at a rate dependent on engine speed is made no more than once per engine revolution and only at the same engine revolution angle at each sampling event.

23. A malfunction diagnosis is apparatus as in claim 1, wherein said filter is a difference filter which subtracts a previously supplied output signal from the supplied output signal.

* * * * *